US010697346B2

(12) United States Patent
Semrow et al.

(10) Patent No.: US 10,697,346 B2
(45) Date of Patent: Jun. 30, 2020

(54) FLEXIBLE AUTOMOTIVE EXHAUST TUBE SYSTEM

(71) Applicant: Nelson Global Products, Inc., Stoughton, WI (US)

(72) Inventors: Isaac Semrow, Madison, WI (US); Robert Schellin, Stoughton, WI (US)

(73) Assignee: Nelson Global Products, Inc., Stoughton, WI (US)

( * ) Notice: Subject to any disclaimer, the term of this patent is extended or adjusted under 35 U.S.C. 154(b) by 166 days.

(21) Appl. No.: 15/435,799

(22) Filed: Feb. 17, 2017

(65) Prior Publication Data
US 2018/0238221 A1    Aug. 23, 2018

(51) Int. Cl.
| | |
|---|---|
| *F16L 27/11* | (2006.01) |
| *F01N 13/14* | (2010.01) |
| *F01N 13/18* | (2010.01) |
| *F01N 13/16* | (2010.01) |
| *F01N 13/08* | (2010.01) |
| *F16L 59/18* | (2006.01) |
| *F16L 51/02* | (2006.01) |
| *F16L 27/10* | (2006.01) |
| *F16L 27/111* | (2006.01) |

(52) U.S. Cl.
CPC ............ *F01N 13/16* (2013.01); *F01N 13/08* (2013.01); *F01N 13/14* (2013.01); *F16L 27/1004* (2013.01); *F16L 27/111* (2013.01); *F16L 51/025* (2013.01); *F16L 51/027* (2013.01); *F16L 59/185* (2013.01); *F01N 2470/12* (2013.01)

(58) Field of Classification Search
CPC ... F16L 27/10; F16L 27/1012; F16L 27/1004; F16L 27/11; F16L 27/111; F16L 27/12; F16L 51/02; F16L 51/025; F16L 51/027; F16L 51/03; F01N 13/00; F01N 13/085; F01N 13/14–13/148; F01N 13/1816
USPC ........... 285/49, 223, 226–228, 235–237, 299
See application file for complete search history.

(56) References Cited

U.S. PATENT DOCUMENTS

| | | | | |
|---|---|---|---|---|
| 3,396,992 | A * | 8/1968 | Hale ....................... | F16L 27/04 285/100 |
| 5,437,479 | A * | 8/1995 | Hartling .............. | F01N 13/1816 285/226 |
| 6,884,398 | B1 * | 4/2005 | Biel, Jr. ............. | B01D 53/9454 422/179 |
| 2006/0032218 | A1 * | 2/2006 | Simon ..................... | F01N 13/14 60/322 |
| 2007/0132232 | A1 * | 6/2007 | Baumhoff ........... | F01N 13/1816 285/226 |
| 2012/0112453 | A1 * | 5/2012 | Stalcup, II .......... | F01N 13/1816 285/226 |
| 2012/0279606 | A1 * | 11/2012 | Teso, Jr. .................. | F01N 13/14 138/140 |
| 2013/0015652 | A1 * | 1/2013 | Thomas .............. | F01N 13/1816 285/47 |

(Continued)

*Primary Examiner* — David Bochna
*Assistant Examiner* — Stacy N Lawson
(74) *Attorney, Agent, or Firm* — Smith Law Office; Jeffry W. Smith (57) ABSTRACT

A flexible tube system having an end section formed from an inner rigid tube and an outer shell, and the end section is joined to a central flexible portion having an inner decoupler tube, and an outer shell bridge is joined to the outer shell and the flexible central portion to define an insulation space.

7 Claims, 6 Drawing Sheets

(56) References Cited

U.S. PATENT DOCUMENTS

2015/0076814 A1* 3/2015 Lucky .................. F01N 13/143
　　　　　　　　　　　　　　　　　　　　285/226

* cited by examiner

FIG. 3

FIG. 6 ized manufacturing facilities and techniques. The tube end portions joined to each end of the flexible central portion typically are rigid with bends and elbows, and therefore are manufactured by a separate company with related expertise. The rigid tube end portions are then wrapped in insulation and an outer thin foil before being attached to the central flexible portion. The insulated tube subassemblies must be robust so they can be shipped, handled, and assembled without damage. One way to protect the insulation, for example, is to add a termination ring that is mounted on each rigid end portion and spaced apart from the end of the end tube portion nearest the central flexible portion. The termination ring provides an attachment location for the outer thin foil sheet used to protect the insulation, and is spaced apart from the end of the end tube portion to provide adequate clearance for handling and assembly to the central flexible portion. Once these end tube portions are joined to each end of the central flexible portion, the assembly is shipped to another party for installation in an exhaust system.

FLEXIBLE AUTOMOTIVE EXHAUST TUBE SYSTEM

FIELD AND BACKGROUND OF THE INVENTION

The present invention relates to flexible tube systems for use in automotive exhaust systems, and particularly to flexible exhaust tubes having shielded and insulated portions for improved performance.

In the automotive industry, particularly the segments for on-road and off-road trucks, agricultural equipment and heavy equipment, exhaust systems can require a flexible tube portion to connect misaligned components and to decouple the components from each other and thereby reduce the effects of vibrations and relative movements of the components. Various flexible tubes are used to accomplish this task, including decouplers and spiral wound gastight hoses. Such tubes and hoses (referred to herein collectively as "tubes") typically have exposed recesses and cavities into which dust, dirt, and agricultural chaff can accumulate.

Flexible exhaust tubes of the type described herein, are assemblies of a number of different parts and subassemblies. Given the complexities of each of the component parts and their respective manufacturing techniques, the parts are typically manufactured by separate companies and assembled before sale and installation.

For example, the flexible central portion can be a bellows or a gas-tight hose requiring specialized manufacturing facilities and techniques. The tube end portions joined to each end of the flexible central portion typically are rigid with bends and elbows, and therefore are manufactured by a separate company with related expertise. The rigid tube end portions are then wrapped in insulation and an outer thin foil before being attached to the central flexible portion. The insulated tube subassemblies must be robust so they can be shipped, handled, and assembled without damage. One way to protect the insulation, for example, is to add a termination ring that is mounted on each rigid end portion and spaced apart from the end of the end tube portion nearest the central flexible portion. The termination ring provides an attachment location for the outer thin foil sheet used to protect the insulation, and is spaced apart from the end of the end tube portion to provide adequate clearance for handling and assembly to the central flexible portion. Once these end tube portions are joined to each end of the central flexible portion, the assembly is shipped to another party for installation in an exhaust system.

This type of assembly results in a robust flexible exhaust tube that decouples unaligned upstream and downstream components such as an upstream engine and a downstream catalytic converter, from vibrations and variable movements as a vehicle travels on road or off. While satisfactory, the described assembly has shortcomings because the termination rings leave exposed and uninsulated tube portions that can result in cooling of the hot exhaust gases passing through the assembly. Further, the exposed tubes become quite hot during use and expose operators and repair personnel to possible injury. The exposed tube portions also define crevices where dirt, debris, and chaff from agricultural operations can accumulate and possibly ignite from the high tube temperatures.

Thus, there is a need for improved flexible tubes for use in automotive exhaust systems.

SUMMARY OF THE INVENTION

The present invention for a flexible tube system provides improvements over prior flexible tube systems by including, an end section having an inner rigid tube and an outer shell spaced apart from the inner rigid tube, a flexible central portion joined to the first end section, the flexible central portion includes an inner decoupler tube joined to the end section rigid tube; a flange joined to and extending radially outwardly from the end section inner rigid tube; and an outer shell bridge to at least partially define an insulation space between the end section and the flexible central portion.

With this arrangement, the flexible automotive exhaust tube system of the present invention eliminates an exposed and uninsulated tube portion on each end of the flexible central portion. The full length of the tube is now insulated to provide a more uniform gas temperature profile from one end of the assembly to another, which improves flow rates through the assembly and improves performance of a downstream catalytic converter by reducing the frequency of catalyst regeneration.

The assembly also substantially improves safety for operators and repair personnel by shielding them from high temperatures of the inner tubes. In addition, the present invention seals recessed areas where debris, dirt, and agricultural chaff can accumulate to improve overall performance of the exhaust system.

Another advantage of the present invention is that it can obviate the need for a termination ring on the rigid tube end portions which can save assembly time and cost. The flange used in the present invention can also provide a mounting location for an outer shell bridge material such as a thin foil and an outer flexible tube surrounding the central flexible portion inner decoupler tube. The outer shell bridge material and the outer flexible tube can be welded to the flange in a single operation to improve the weld, as well as save time and expense in manufacturing.

The flexible central portion can include an outer flexible tube spaced apart from the decoupler and joined to the flange to at least partially define an insulation space between the decoupler and the outer flexible tube. As stated above, in some embodiments, the outer flexible tube is joined to the flange and to the outer shell bridge material. In other embodiments, the outer bridge material is an extension of the outer shell surrounding the end section.

A second end section can also be provided, which includes: an inner rigid tube and an outer shell spaced apart from the inner rigid tube, and the second end section inner rigid tube is joined to the central flexible portion; a second flange joined to and extending radially outwardly from the second end section inner rigid tube; and a second outer shell bridge joined to the second end section outer shell and the second flange.

Further details and improvements of the present invention are described below.

DETAILED DESCRIPTION OF THE DRAWINGS

In the following detailed description of the drawings, the same reference numerals will be used to identify the same or similar element in each of the figures unless otherwise noted. Further, the materials, connections, dimensions, shapes, and relative sizes of the components can deviate from those described and illustrated, yet remain within the scope of the present invention. It is also noted, that manufacturing tolerances, installation techniques, and adjustments to the flexible tube system are considered inconsequential variations of the claims appended hereto.

The terms "first end section", "second end section", "upstream", and "downstream", do not limit the orientation of the system being claimed, and it should be understood that the orientation of the claimed systems can be reversed while remaining within the scope of the invention.

Illustrated in FIGS. 1 through 4 is a first embodiment of a flexible tube system 10, in accordance with the present invention. The flexible tube system 10 is a component of an exhaust system for a motor vehicle (not illustrated) that can be an off-road or on-road vehicle. The flexible tube system 10 transfers hot and pressurized exhaust gas from an upstream component 12 to a downstream component 16. The upstream component 12 and downstream component 16 may or may not be aligned, and are typically subject to variable forces and vibrations (represented by arrows 15) that would tax, and could cause failure of, a rigid tube. Thus, the flexible tube systems of the present invention decouple the components to accommodate misalignment and withstand differential forces and vibrations.

The flexible tube system 10 includes a first end section 24, a flexible central portion 26, and second end section 28. In the flexible tube system 10, the first end section 24 is a relatively rigid section for connection to the upstream component 12. The second end section 28 is also a relatively rigid section for connection to the downstream component 16. In a preferred embodiment, the elements used in construction of the first end section 24 and the second end section 28 are essentially the same, but in specific installations, the elements of the end sections 24 and 28 can vary. For example, in some embodiments, it may be desirable to: use materials with different rigidities or thermal characteristics, add elements, or omit elements to accommodate a specific type of installation.

Further, the first end section 24 and the second end section 28 illustrated in the figures and described herein are examples, so it should be understood that these elements can vary in construction, shape, and length, including for example, variations in: cross sectional shape; orientation; tube length; and degree and direction of bend; and still be within the scope of the present invention.

It is noted that, the first end section 24 and the second end section 28, as well as their sub-elements are described herein as "rigid", but that term is to be understood as simply being less flexible relative to the flexible central portion 26. In installation, use, and repair, the first end section 24 and the second end section 28 will have some degree of elastic and plastic deformation, yet still provide a solid and robust connection to engine exhaust components 12 and 16. Thus, for proper connections and orientations of the flexible tube system 10, the end sections 24 and 28 should be "rigid" relative to the flexible central portion 26. The rigidity of the first end section 24 and the second end section 28 also provides support for insulating material that reduces heat loss from these portions of the flexible tube system 10 of this invention.

Figure 1:
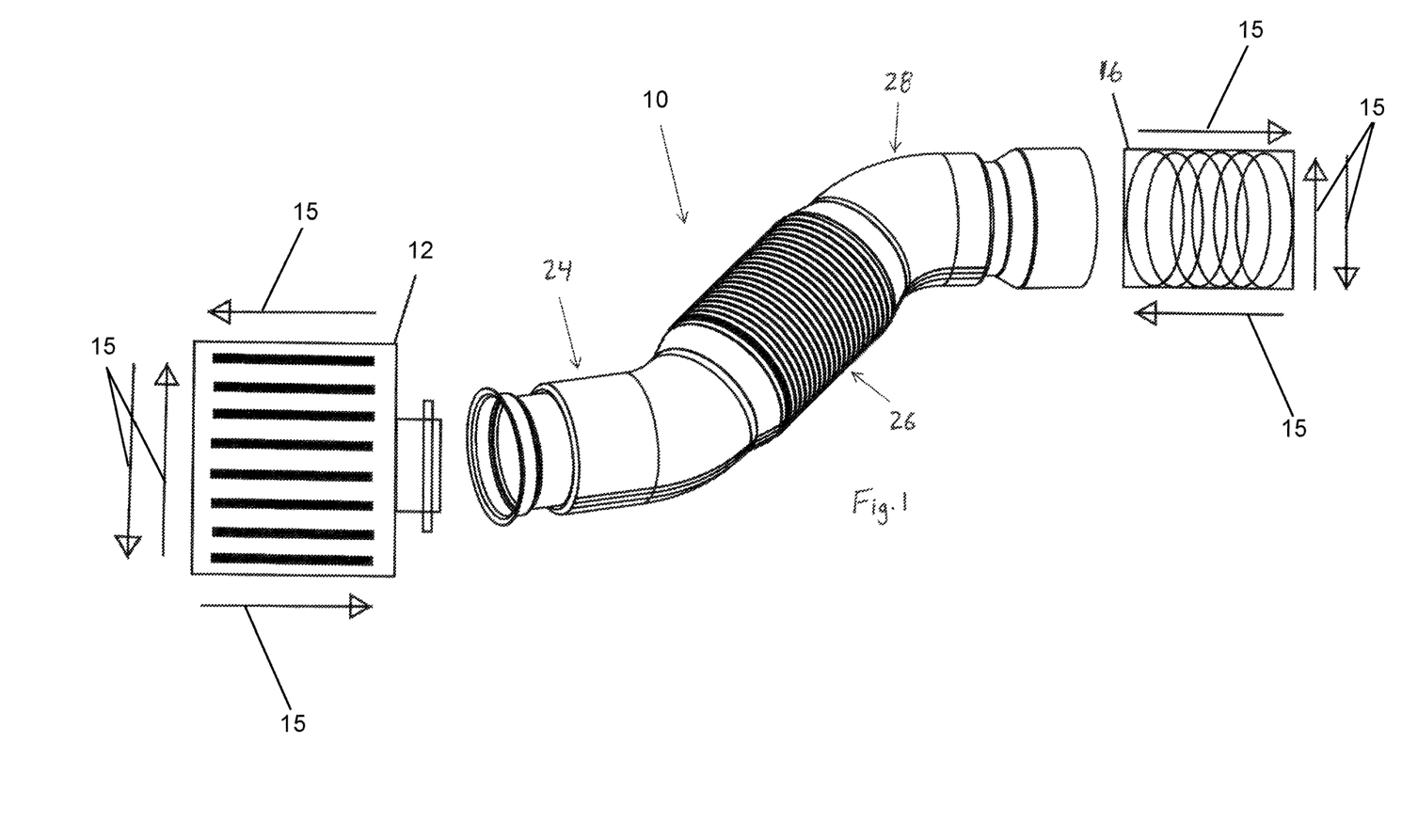
FIG. 1 is a perspective view of an embodiment of a flexible tube system and related exhaust system components in accordance with the present invention.
Figure 2:
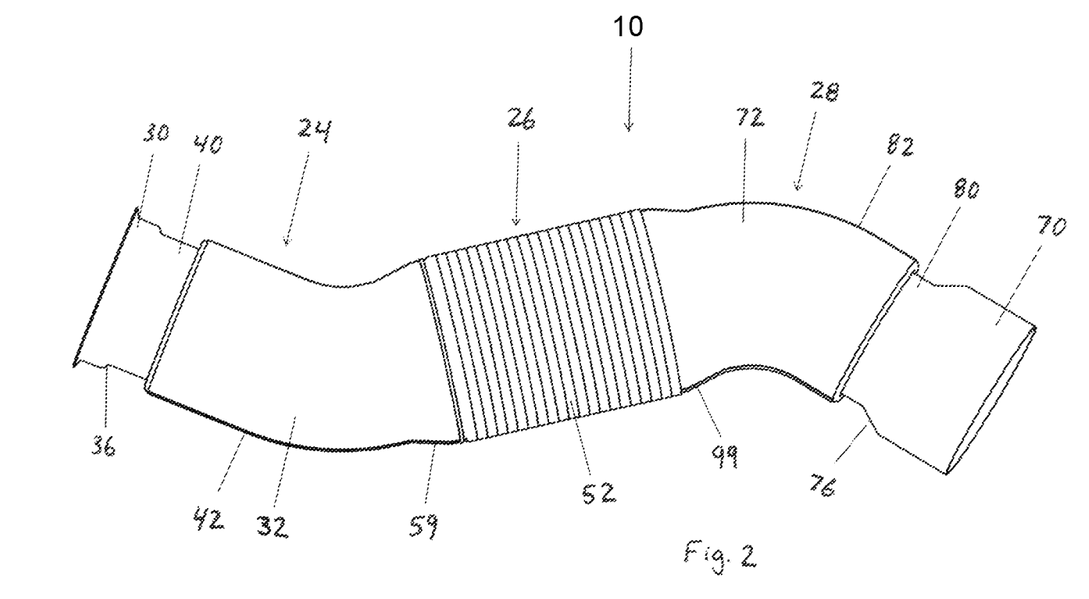
FIG. 2 is a side view of the flexible tube system of FIG. 1.

Accordingly, as best seen in FIG. 2, the first end section 24 includes a coupling 30 and an elbow 32. The coupling 30 is sized and shaped to mate with the upstream exhaust system component 12 (see FIG. 1). The cross sectional shape and size of the coupling 30 may be different from the other elements of the flexible tube system 10. The illustrated embodiment includes a coupling 30 that is the same round cross sectional shape, but has a larger diameter than the downstream elbow 32. Thus, a straight wall transition 36 is provided for proper mating with the elbow 32, but the straight wall transition 36 could be tapered or any other transition element or shape. Similarly, to maintain desired flow characteristics the shape and size of the first end section 24, as well as other elements of the invention, can be selected to control and accommodate gas flow characteristics through the flexible tube system 10.

Figure 3:
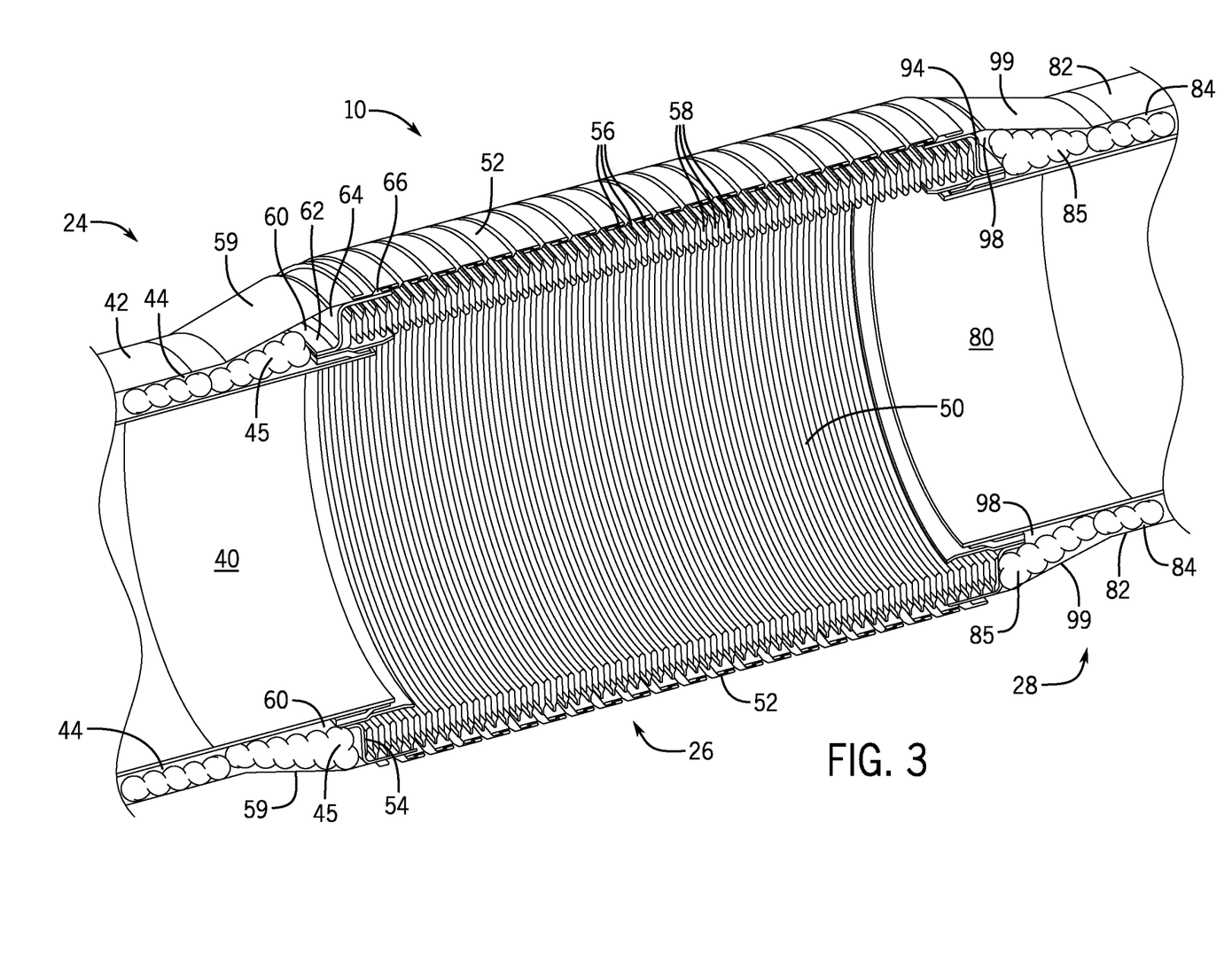
FIG. 3 is a perspective cross sectional view of a flexible central portion of the flexible tube system of FIG. 1.
Figure 4:
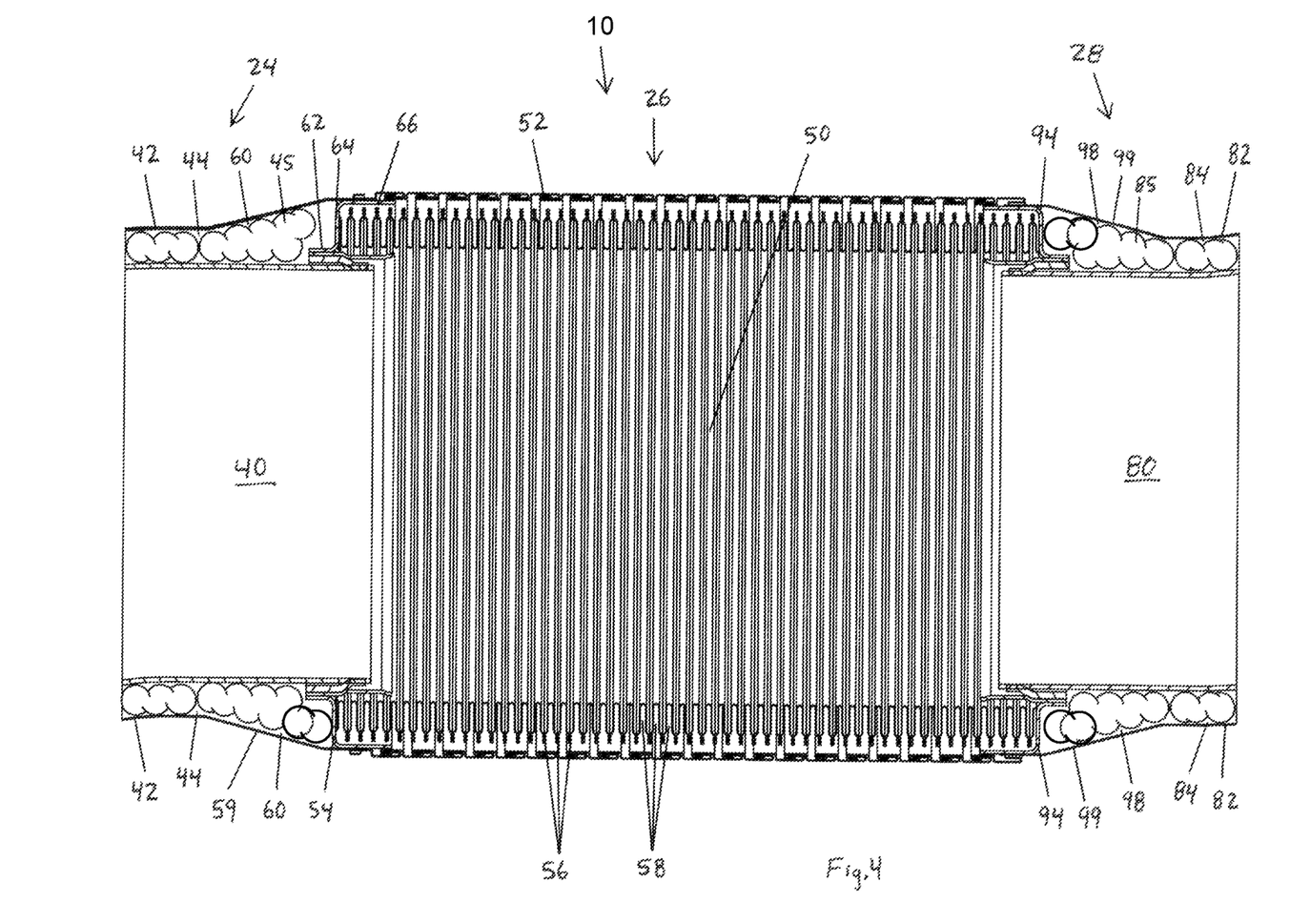
FIG. 4 is a side cross sectional view of the flexible central portion of the flexible tube system of FIG. 1.

As best seen in FIGS. 3 and 4, the first end section 24 includes an inner rigid tube 40 and an outer shell 42, which is spaced apart from the inner rigid tube 40 to define an insulation space 44. The inner rigid tube 40 is preferably formed from a heat and corrosion resistant material, such as stainless steel. As stated above, the inner rigid tube 40 need not be strictly rigid, but its material properties and dimensions are selected to withstand design forces, connections, and the heat, pressure, and corrosive nature of exhaust gases being communicated through the flexible tube system 10.

The outer shell 42 and the insulation space 44 are provided to reduce heat loss from the exhaust gases, which are preferably maintained within desired temperature ranges for proper exhaust gas decomposition in the downstream exhaust system component 16 (see FIG. 1). The outer shell 42 is preferably made of an embossed foil to reduce weight and cost, but it can be made of other materials as well. Indeed, to enhance structural rigidity or heat retention, the outer shell 42 can also be relatively rigid and even be connected to the inner rigid tube 40.

The insulation space 44 is illustrated as annular and symmetrical along its length, but any desired shape and relative dimensions could be used to enhance or otherwise control insulating properties. Further, the insulation space 44 dimensions can be adjusted to accommodate flexibility of the flexible tube system 10 or provide clearance from other engine and exhaust components. An insulating material 45 can be, and preferably is, installed in the insulation space 44. The insulating material 45 can be of any desired type, and it can be flexible or rigid.

As best seen in FIG. 2, the outer shell 42 and the insulation space 44 are illustrated as covering most of the elbow 32, but not the coupling 30. Nonetheless, the outer shell 42 and the insulation space 44 could be modified to cover the coupling 30 in various types of installations to accommodate atmospheric conditions and other considerations.

The flexible central portion 26 is best illustrated in FIGS. 3 and 4, and it includes an inner decoupler tube 50, an outer flexible tube 52, a first flange 54, and a second flange 94. The inner decoupler tube 50 preferably is a gas tight tube of a type available from Westfalia Metal Hose Group GmbH & Co. KG, Am Schwanenweiher 1, 57271 Hilchenbach, Germany. Various types of such flexible gas tight tubes are available from this supplier, as well as others to accommodate different applications. In addition, the present invention can be used with other types of "decoupler" tubes 50 known in the art, such as corrugated, hydroformed, elastomer formed, spiral wound, and others. The inner decoupler tube 50 is illustrated as a spiral configuration, but the decoupler can be segmented with the segments joined in any suitable fashion, including being welded or crimped together.

The illustrated inner decoupler tube 50, is preferably spiral wound to define radially outwardly extending convolutes 56 that define decoupler gaps or spaces 58 therebetween. In addition, the inner decoupler tube 50 is uninsulated due to the shape and flexibility of the convolutes 56. The inner decoupler tube 50 performs the important functions of communicating exhaust gases between unaligned exhaust system components and decoupling exhaust system components to reduce stresses from differential forces and vibrations.

To overcome the above shortcomings of decoupler tubes 50, the outer flexible tube 52 is preferably provided to shield the inner decoupler tube 50 from dirt, debris, and chaff while also insulating the inner decoupler tube 50. The outer flexible tube 52 is flexible enough to accommodate flexing of the inner decoupler tube 50, and includes a series of interlocking joints, for example. This outer flexible tube 52 need not be gas tight because the inner decoupler tube 50 prevents exhaust gas from reaching the outer flexible tube 52. Nonetheless, the outer flexible tube 52 could be gas tight if desired.

As best seen in FIG. 4, the outer flexible tube 52 is preferably spaced apart from the inner decoupler tube 50 by any desired amount to provide an insulating space and to avoid contact with the inner decoupler tube 50 that could cause rattling and unnecessary wear, as well as, restrict flexibility of the flexible tube system 10. Further, the spacing can be uniform or varied so that more space exists above the top of the inner decoupler tube 50 than the bottom of the inner decoupler tube 50. Other structures for the outer flexible tube 52 are also within the scope of the present invention.

The flange 54 is joined to and extends radially outwardly from the end section inner rigid tube 40. The flange 54 can be brazed, welded, fastened or otherwise joined to the inner rigid tube 40 in any suitable manner. The flange 54 preferably includes a base 62 joined to the inner rigid tube 40, a radially extending member 64, and a rim 66, but other shapes can be used. The various parts of the flange 54 provide suitable connection points for the adjacent elements described below, and can also define an end to the insulation space 60. The illustrated embodiment includes a singular ring-shaped flange 54, but other shapes can be used. In other embodiments, the flange 54 can be made in segments or there can be additional flanges to accommodate desired mounting locations and provide desired structural and thermodynamic properties.

The outer flexible tube 52 is joined to the rim 66 of the flange 54 using any suitable means as described above, such as welding for example. In addition, the outer shell bridge 59, and the outer flexible tube 52 can be welded to the flange 54 in a single operation for an improved and cost effective connection. The dimension of the radially extending member 64 from the base 62 relative to the convolutes 56 of the inner decoupler tube 50 defines the spacing between the inner decoupler tube 50 and the outer flexible tube 52. Alternatively, the outer flexible tube 52 and the inner decoupler tube 50 can be joined along their respective lengths or intermittently to define a unified, but flexible, structure.

Preferably, the flange 54 is ring-shaped and has uniform dimensions, but other shapes and varying dimensions are possible. Further, the flange 54 is preferably rigid, but it can be flexible or have a pivoting portion that flexes with any bending of the flexible tube system 10. Such an arrangement would provide additional flexibility and reduce wear on the flexible tube system 10.

The integration of the outer flexible tube 52 and the flange 54 connected to the inner rigid tube 40 of a respective end section 24/28, provides improved structural characteristics to the flexible tube system 10, so that lighter, simpler, or less robust designs can be used for the inner decoupler tube 50, if desired. This combination of flexible central portion 26 with the outer flexible tube 52 and the flange 54, can provide a more robust structure that enables the use of lighter and/or more flexible materials for improved characteristics and possibly reduced costs.

An outer shell bridge 59 of the present invention extends between the outer shell 42 and the flexible central portion 26 to define an insulation space 60, which can be separate from the insulation space 44, or an extension of the insulation space 44, as illustrated. Further, the outer shell bridge 59 can be a separate element from, or simply be an extension of, the outer shell 42. An insulating material 45 can also be installed in the insulation space 60, and the insulating material 45 can be the same material or different from the insulating material 45 used in the insulation space 44.

The flange 54 rim 66 is also preferably joined to the outer shell bridge 59, so that the flange 54, the inner rigid tube 40, and the outer shell bridge 59 define the insulation space 60 to improve the overall thermal characteristics of the flexible tube system 10. As stated above, the outer shell bridge 59 and the outer flexible tube 52 are preferably joined to the flange 54 with a single weld.

The second end section 28 illustrated in FIGS. 2 through 4 includes a coupling 70 and an elbow 72, but the shape, dimensions, and orientation of the elbow 72 are different than those described above in relation to the first end section 24. These variations are used to adapt the flexible tube system 10 to different installation types. Nonetheless, the elements and general structure of the second end section 28 are preferably similar to the first end section 24.

One exception to the similarities of the first end section 24 and the second end section 28 is that the first end section 24 includes a straight wall transition 36 and the second end section 28 includes a tapered portion 76. Other design variations are possible within the scope of the invention.

In the illustrated embodiment, the second end section 28 includes the coupling 70, the elbow 72, an inner rigid tube 80, an outer shell 82, an insulation space 84, a flange 94, and an outer shell bridge 99, all of which perform the same or similar functions described above in relation to the elements of the first end section 24. In addition, the inner rigid tube 80, the outer flexible tube 52, and the outer shell bridge 99 are all joined to the flange 94 to interact as described above, and to define an insulation space 98, which essentially extends the insulation space 84 to improve the overall thermal characteristics of the flexible tube system 10. Preferably, thermal characteristics are improved even further with the insertion of an insulating material 85 in the insulation space 98.

The resulting flexible tube system 10 improves the structural and thermodynamic properties of prior flexible tube systems.

Figure 5:
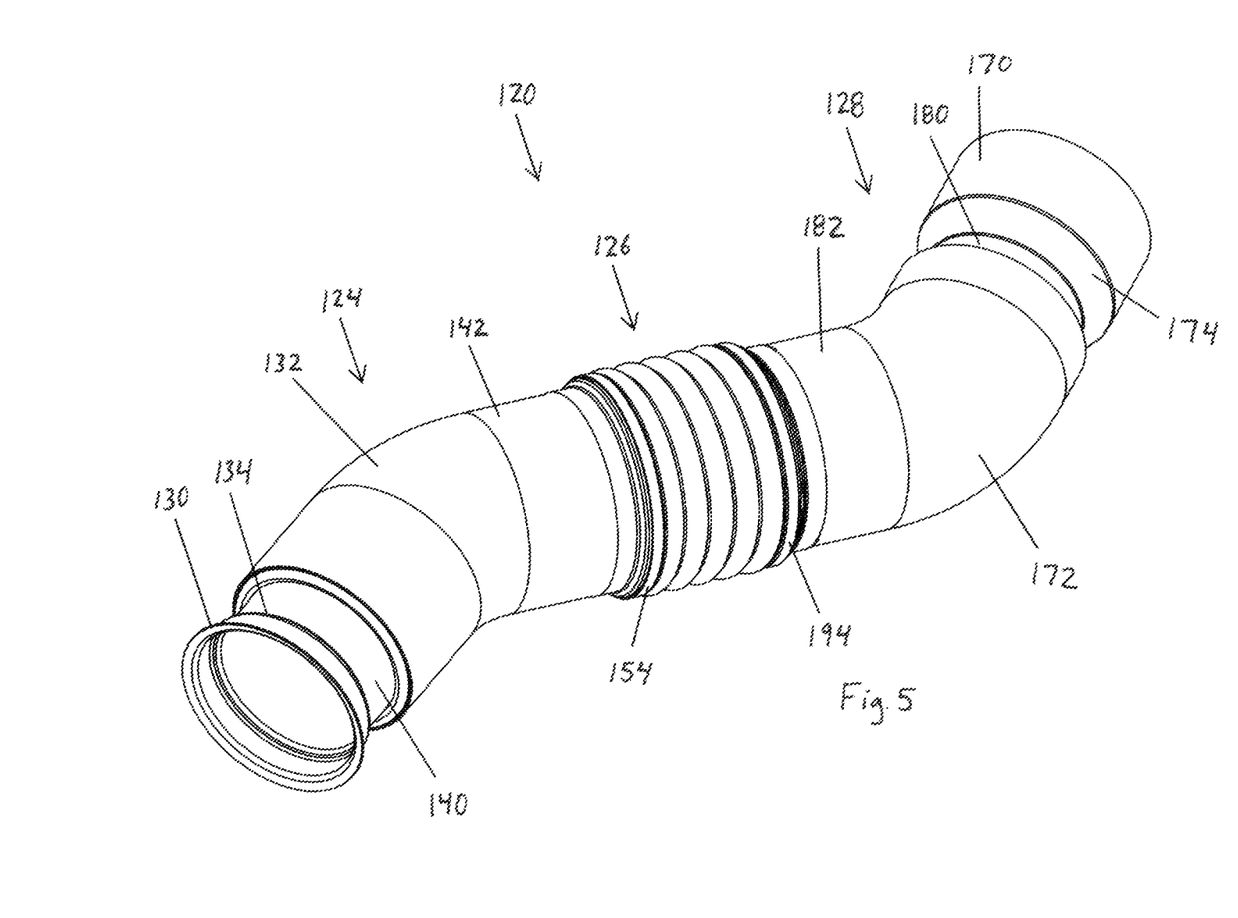
FIG. 5 is a perspective view of an alternate embodiment of a flexible tube system in accordance with the present invention.
Figure 6:
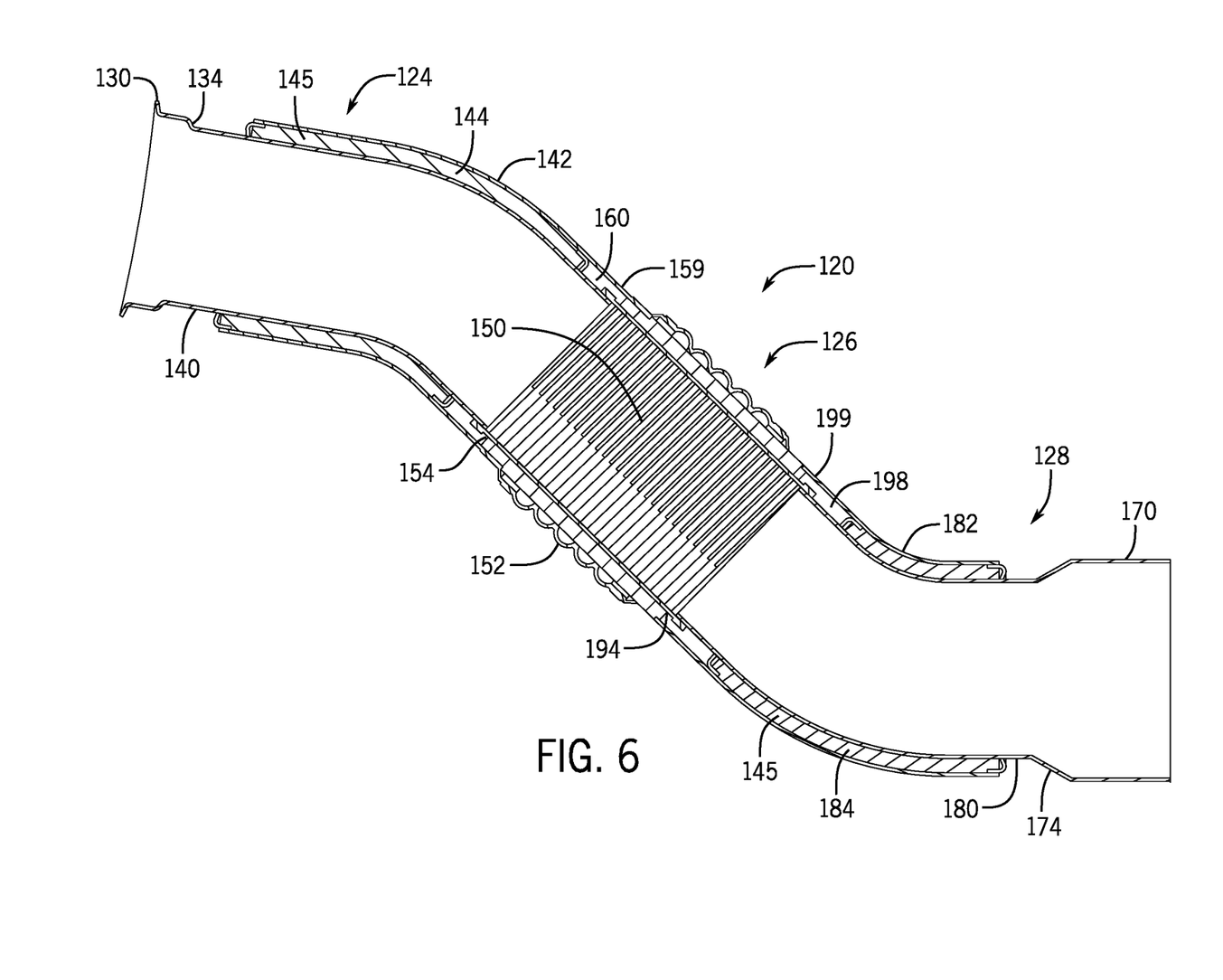
FIG. 6 is a side cross sectional view of the flexible tube system of FIG. 5

FIGS. 5 and 6 illustrate an alternate embodiment of the present invention, which includes a first end section 124, a flexible central portion 126, and a second end section 128. All of the variations and alternatives described above in relation to the flexible tube system 10 apply to this embodiment 120, as well.

The first end section 124 includes a coupling 130, an elbow 132, and a straight wall transition 134. The first end section 124 further includes an inner rigid tube 140, an outer shell 142, and an insulation space 144.

The flexible tube system embodiment 120 and the flexible tube system embodiment 10, described above, are similar except that they use different flexible central portions 26/126. Otherwise, the structure, functions, and interactions of the two embodiments are similar. The flanges 154 and 194 are shaped and positioned to accommodate the spacing of the end sections 124 and 128 and the flexible central portion 126.

The flexible central portion 126 includes an inner decoupler tube 150, an outer flexible tube 152, and the flanges 154 and 194. The outer flexible tube 152 is illustrated as an elastomer boot, as opposed to an interlocking joint embodiment of the outer flexible tube 52 of the embodiment 10 described above. All of the functions, features, and options described above in relation to the flexible central portion 26 apply to the embodiment of the flexible central portion 126.

An outer shell bridge 159 extends between the outer shell 142 and the flexible central portion 126 to define an insulation space 160, which can be separate from the insulation space 144, as illustrated, or an extension of the insulation space 144. An insulating material 145 can also be installed in the insulation space 160, and the insulating material 145 can be the same material or different from the insulating material 145 used in the insulation space 144.

The second end section 128 includes a coupling 170, an elbow 172, and a tapered portion 174. The second end section 128 further includes an inner rigid tube 180, an outer shell 182, and an insulation space 184. A second outer shell bridge 199 is provided to define an insulation space 198, as described above. A flange 194 is also provided, as described above to provide the necessary connections.

The foregoing detailed description of the drawings is provided for clearness of understanding only, and no unnecessary limitations therefrom should be read into the following claims.

The invention claimed is:

1. A flexible tube system comprising:
    an end section having an innermost rigid tube at least partially defining an exhaust gas conduit, and an outer shell spaced apart from the innermost rigid tube;
    a flange joined to and extending radially outwardly from the end section innermost rigid tube, wherein the flange defines a rim spaced apart from the innermost rigid tube;
    a flexible central portion joined to the end section, the flexible central portion including an inner decoupler tube joined to the end section innermost rigid tube and an outer flexible tube joined to the rim, wherein the flexible central portion is not disposed between the flange and the innermost rigid tube at a location where the flange is joined to the innermost rigid tube; and
    an end section outer shell bridge joined to the outer shell and the flange at a position that is spaced apart from the innermost rigid tube to at least partially define an insulation space with the end section innermost rigid tube and the flange.

2. The flexible tube system of claim 1, wherein the flexible central portion outer flexible tube is disposed at least partially around and spaced apart from the inner decoupler tube, and joined to the flange.

3. The flexible tube system of claim 1, wherein:
    the end section outer shell bridge is an extension of the outer shell.

4. The flexible tube system of claim 1, wherein:
    the insulation space is at least partially filled with insulation.

5. The flexible tube system of claim 2, wherein the outer shell bridge is joined to the outer flexible tube.

6. The flexible tube system of claim 1, and further comprising:
    a second end section having an innermost rigid tube and an outer shell spaced apart from the second end section innermost rigid tube;
    a second flange joined to and extending outwardly from the second end section innermost rigid tube, wherein the second flange defines a rim joined to the outer flexible tube and spaced apart from the second end section innermost rigid tube; and
    a second end section outer shell bridge joined to the second end section outer shell and the second flange at a position that is spaced apart from the innermost rigid tube of the second end section to at least partially define a second insulation space between the second end section innermost rigid tube and the second flange.

7. The flexible tube system of claim 1, wherein the flexible central portion outer flexible tube is disposed at least partially around and spaced apart from the inner decoupler tube, and the outer flexible tube is joined to the flange and to the end section outer shell bridge.

* * * * *